United States Patent [19]

Cole et al.

[11] Patent Number: 4,724,526

[45] Date of Patent: Feb. 9, 1988

[54] APPARATUS AND METHOD FOR DETERMINING OBJECT ELEVATION AND HEIGHT FROM IMAGES THEREOF

[75] Inventors: Kelly P. Cole, Avon; Kurt H. Kreckel, Fairport; Robert T. Shone, Pittsford, all of N.Y.

[73] Assignee: Bausch & Lomb Incorporated, Rochester, N.Y.

[21] Appl. No.: 649,790

[22] Filed: Sep. 11, 1984

[51] Int. Cl.[4] .................. G01C 11/12; G06K 9/00
[52] U.S. Cl. .................... 364/562; 250/558; 350/136; 356/2; 364/525
[58] Field of Search .......... 364/562, 525, 420, 524; 350/130, 131, 133, 136, 558; 356/2; 250/558

[56] References Cited

U.S. PATENT DOCUMENTS

| | | | |
|---|---|---|---|
| 3,655,911 | 4/1972 | Johnston | 250/558 |
| 3,677,645 | 4/1972 | Johnston | 250/558 |
| 3,678,582 | 4/1972 | Helava et al. | 350/136 |
| 3,726,591 | 4/1973 | Helara et al. | 356/2 |
| 3,729,830 | 5/1973 | Blachut et al. | 350/136 |
| 3,752,580 | 8/1973 | Hardy | 356/2 |
| 3,783,294 | 1/1974 | Koper | 250/558 |
| 3,943,344 | 3/1976 | Kidode et al. | 364/562 |
| 3,989,933 | 11/1976 | Inghilleri | 364/525 |
| 4,202,037 | 5/1980 | Glaser et al. | 364/525 |
| 4,281,923 | 8/1981 | Friedman | 356/2 |
| 4,539,701 | 9/1985 | Galbreath et al. | 356/2 |

OTHER PUBLICATIONS

Moffitt, Francis H., *Photogrammetry*, 3rd ed., (Scranton: International Texbook Co., 1959), chapters 7, 8, 12.
*Manual of Photogrammetry*, 3rd ed., (Falls Church: American Society of Photogrammetry, 1966), vols. I, II, chapters 10-12.

Primary Examiner—Gary Chin
Assistant Examiner—Daniel W. Juffernbruch
Attorney, Agent, or Firm—John S. Norton

[57] ABSTRACT

A cartographic apparatus for determination of the elevations of features and heights of objects from stereoscopic images of complementing input records includes a parallax bar and movable reticles for generating a floating mark over points of interest in the records. The apparatus also includes a microprocessor to compute compensation factors based on values determined during initial set up and means responsive to those factors to compensate automatically for y parallax and for errors in x parallax difference as the floating mark is moved and to compute automatically object heights and feature elevations.

5 Claims, 7 Drawing Figures

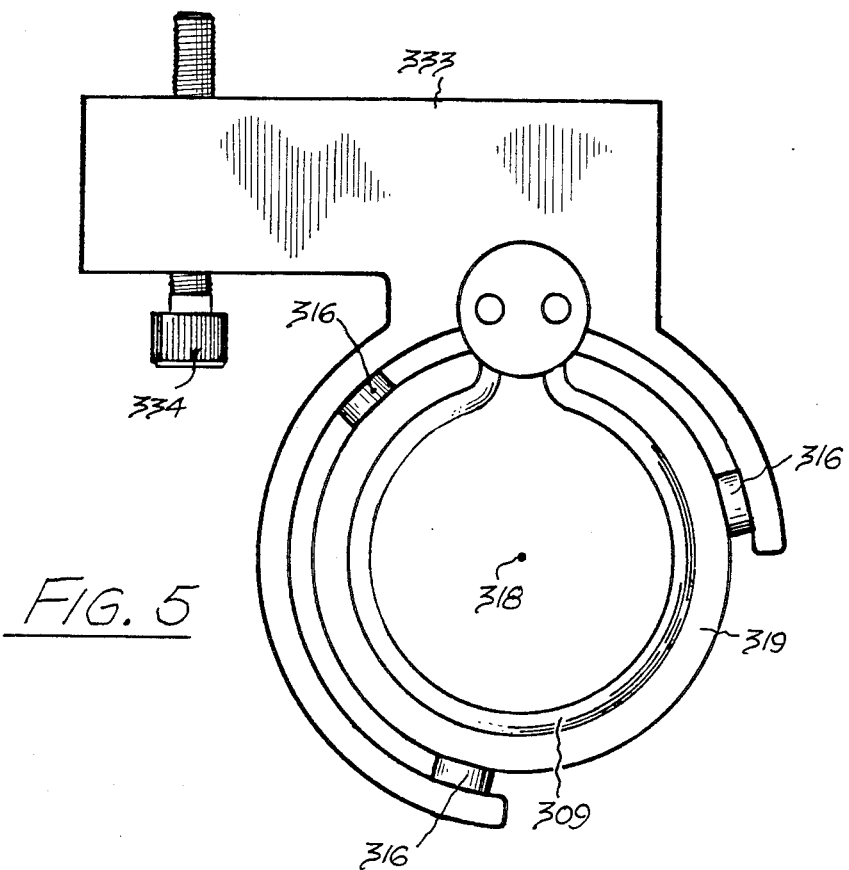
_Fig. 5_
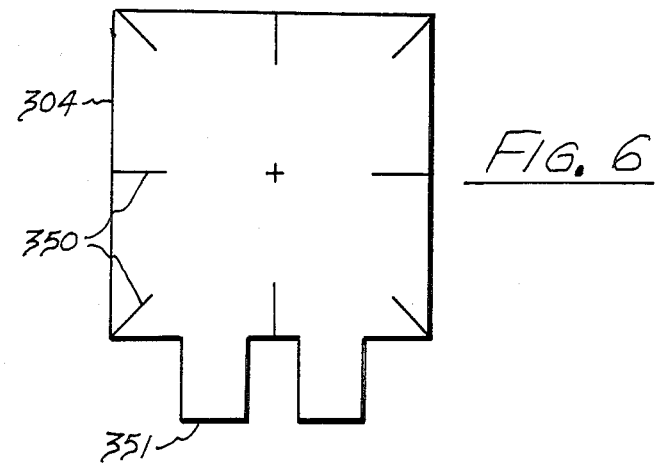
_Fig. 6_

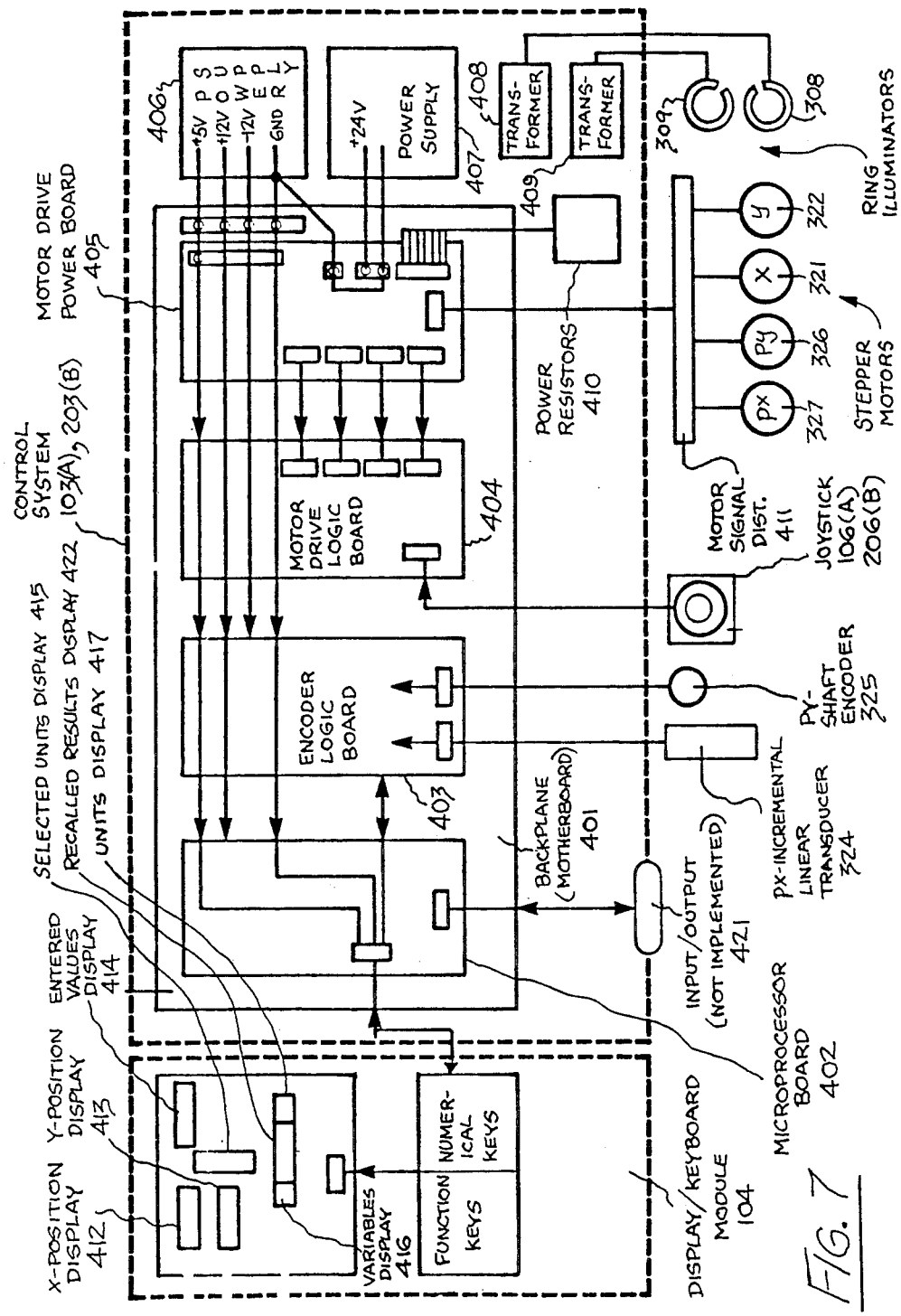

APPARATUS AND METHOD FOR DETERMINING OBJECT ELEVATION AND HEIGHT FROM IMAGES THEREOF

TECHNICAL FIELD

The present invention relates generally to the determination of elevation and height of objects from images thereof. More particularly, the present invention relates to an apparatus and method for determining the elevation and height of remote objects on the earth's surface and recording same for cartographic purposes by measurement of specific image characteristics.

BACKGROUND ART

Many cartographic and photogrammetric devices are known for measurement of elevations of the terrain and of heights of objects on the terrain. These devices, commonly known as "stereoscopic plotting instruments", the purpose of which, generally, is to compute positions of points in a three-dimensional space (including elevations), employ mechanical, optical, opto-mechanical and analytical techniques for making these and other photogrammetric measurements, and to record or plot the results thereof.

The most sophisticated stereoscopic plotting instruments are known as "analytical plotters", and are complex, large in size, require specialized training to use and are expensive. Other more simple and less expensive instruments are referred to as "stereometers" (also known as "parallax bars"). Stereometers are used in conjunction with stereoviewers to obtain approximate information about elevations of points in three-dimensional space. The presently available instruments of this type measure stereoscopic parallax differences to obtain data for computation of elevations, and are relatively inaccurate and difficult to use on a continuous basis.

Different types of such instruments and their limitations are described in some detail by Francis H. Moffitt, et al. in Chapters 7, 8 and 12 of the Third Edition text entitled "Photogrammetry", published by the International Textbook Company of Scranton, Pennsylvania in 1980; and in Chapters 10-12 of the Fourth Edition of the text entitled "Manual of Photogrammetry" published by the American Society of Photogrammetry in Falls Church, Va. in 1980.

DISCLOSURE OF INVENTION

It is, therefore, an object of the invention to provide an apparatus and method for determining the elevations and heights of objects from images thereof that combines the simplicity of a stereometer with the accuracy and elevation and height computational capability of analytical stereoscopic plotting instruments.

It is another object of the invention to provide an apparatus and method, as set forth above, that determines elevations and heights from measurements on images obtained by close range photography of the dimensions of objects in the direction perpendicular to the plane of reference (irrespective of the magnitude and direction of the inclination of the plane of reference with respect to the vertical).

It is still another object of the invention to provide an apparatus and method, as set forth above, that is easy to use by persons whose primary skills are not in photogrammetry or cartography, that is smaller and costs considerably less than existing stereoscopic plotting instruments, and that greatly aids the operator by automating certain alignment functions required in such elevation and height determinations.

It is yet another object of the invention to provide an apparatus and method, as set forth above, that may be used in conjunction with stereoscopic viewing instruments (such as the Stereo Zoom Transfer Scope commercially available from Bausch & Lomb Incorporated of Rochester, NY, or readily installed as an accessory to such existing instruments, thereby enhancing the capabilities of such instruments to determine terrain elevations and heights of objects of interest from images on pairs of stereoscopic aerial and satellite photographs.

It is still a further object of the invention to provide an apparatus and method, as set forth above, which could be operated readily in an office environment without special design provisions for temperature and vibration effects which sometimes are required in existing analytical plotters.

These and other objects and advantages of the present invention over existing prior art forms will become more apparent and fully understood from the following description in conjunction with the accompanying drawings.

BRIEF DESCRIPTION OF THE DRAWINGS

FIG. 1 diagrammatically depicts operator interaction with and data transfer within the VMA Module 11.

FIG. 1 diagrammatically depicts operator interaction with and data transfer within the VMB Module 12.

FIG. 5 is a plan view of an exemplary reticle assembly.

FIG. 6 is a plan view of an exemplary photo carrier.

FIG. 7 is a block diagram of the electronic control circuit included within the apparatus of the present invention.

PREFERRED EMBODIMENT FOR CARRYING OUT THE INVENTION

Figure 1:
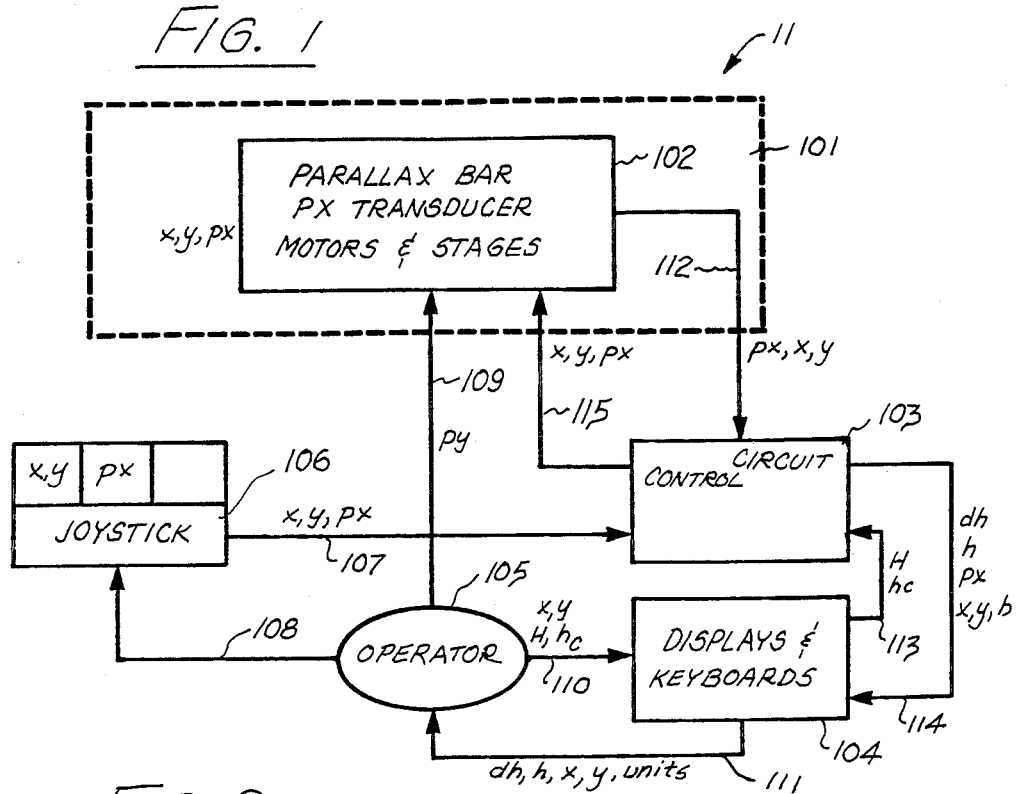
FIG. 1 is a block diagram of an exemplary apparatus 11 according to the concept of the present invention, occasionally hereinafter called the "VMA Module", for determination of object heights and local elevations relative to a known control point elevation.

In order to facilitate an accurate understanding of the apparatus and method of the present invention, the following definitions and symbol usage shall apply throughout:

"Base" means the distance between the principal points of two adjacent prints in a series of vertical aerial photographs. Base distance on the photographs corresponds to the flying distance of the aircraft between two successive vertical photographs.

"Base Map" means a map showing certain fundamental information, used as a base upon which additional data of specialized nature are compiled, i.e., a source map.

"Conjugate Point" means a point on one stereo photograph corresponding to a point on the other stereo photograph where both points represent the identical point on the terrain.

"Elevation" means the vertical distance from the datum (usually mean sea level) to a point or object on the earth's surface.

"Fiducial Marks" means index marks, of which there are usually at least four, that are rigidly connected with the camera lens through the camera body and which form images on the negative and usually define the "principal point" of the photograph.

"Flight Altitude" means the vertical distance above a given datum (usually mean sea level) of an aircraft in flight during a specified portion of a flight.

"Flight Height" means the vertical distance above the point on the earth's surface corresponding to the left or right principal point on the stereo photograph of an aircraft in flight during a specified portion of a flight.

"Height" means the difference in the vertical direction between the elevation at the base of and the top of an object on the earth's surface. In the context of the specific application discussed herein, the term "height" also means the dimension in the direction perpendicular to a reference plane, irrespective of the inclination of the reference plane with respect to the horizontal.

"Parallax" is used herein in three contexts—"Absolute Stereoscopic Parallax", "X Parallax Difference" and "Y Parallax". "Absolute Stereoscopic Parallax" refers to the algebraic difference in the distances of two images along the flight line from their respective principal points. "X Parallax Difference" denotes the difference in the Absolute Stereoscopic Parallax of two points imaged on a pair of photographs. "Y Parallax" refers to relative misalignment of the photographs in the direction perpendicular to the flight line.

"Parallax Bar" means a measuring device containing a micrometer movement by means of which the separation of two reticle marks can be changed to measure parallax difference on a stereoscopic pair of photographs.

"Photograph" and "Map" refer to certain types of graphic depictions of terrain or objects for cartographic, earth resource management, intelligence, travel, or other purposes, irrespective of the manner in which the images comprising such photograph or map are stored, presented to the operator or used.

"Principal Point" means the foot of the perpendicular from the perspective center (lens) of a photographic camera system to the plane of the photograph.

"Thematic Map" means a special purpose map which includes more extensive information than a general purpose map on some field of specific interest, such as urban planning, resource management, forestry, wetlands management, etc.

"Z.T.S." is a trademark owned by Bausch & Lomb Incorporated of Rochester, NY to refer to its photogrammetric optical instrument for acquisition and transfer of planimetric data between stereoscopic pairs of aerial photographs and the corresponding maps, known as the Stereo Zoom Transfer Scope. Z.T.S. has the capability of enlarging, rotating, changing shape and translating of stereo photographs and other input materials so as to achieve a good match and the stereoscopic perception effect. A primary function of the Z.T.S. is to assist the operator in transferring graphic information from a new data source, such as aerial photographs, to an existing data base, such as a map, when each of them may be at different scales. To accomplish this, the operator views the data base with a fixed optical system and the new source with zoom optical systems. One photograph and the map are matched to scale until they are superimposed. The operator can then compare the new data source with the existing data base and transfer the required new information onto the existing data base. Z.T.S. instruments are used for map completion, map revision, or preparation of thematic maps.

x—the horizontal coordinate along the flight line of the measuring mark position; it is positive in the direction to the right of the right principal point. y—the vertical coordinate (perpendicular to the x coordinate direction) of the measuring mark position; it is positive in the direction +90° relative to the positive direction of the x coordinate axis.

x, y—the ground control point positions (used only in the VMB Module).

$h_C$—the ground control point elevation (with respect to datum).

px—x parallax difference.

py—y parallax.

dh—the incremental change in elevation or height of an object.

h—the elevation of any point (with respect to datum).

H—the flight height with respect to the left principal point.

$h_A$—the elevation of the left principal point.

dpx—the correction to the x parallax difference (used only in the VMB Module).

dpy—the correction to the y parallax (used only in the VMB Module).

b—the base, i.e., the distance between a principal point and the conjugate of the other principal point on the same photograph.

f—the focal length of the camera lens (used only in the VMB Module).

d—the grid distance from the principal points to certain points located on y axes passing through each of the two principal points. There are two points for each principal point: one located in the plus y direction and the other in the minus y direction. The grid points are used in the VMB Module to measure the y parallax in order to find the corrections necessary to compensate for relative camera tilts and displacement.

Inasmuch as different applications call for different accuracies in determining elevations and heights, it has been found convenient to provide for two embodiments of the apparatus and method of the present invention, which invention is generally indicated in the drawings by the numerical 10. These two embodiments are both microprocessor based and are substantially similar in structure, differing most significantly in the procedure each employs. The first embodiment presented is called arbitrarily the "Vertical Measurement A Module" or "VMA Module" and is generally indicated in the drawings by the numeral 11; the second embodiment is known as the "Vertical Measurement B Module" or "VMB Module" and is generally indicated in the drawings by the numeral 12.

The VMA Module is intended for determination of object heights and of local elevations, the latter when the elevation of a control point on the photograph is known, for instance from the map of the area, which is superimposed in the Z.T.S. on the image of the right photograph. To compute the magnitudes of the elevations and heights, the VMA Module uses a simplified mathematical formula which, for instance, assumes that the photography is truly vertical, instead of near-vertical, as is usually the case. This approximation is entirely adequate to achieve an accuracy fully satisfactory for the intended applications, such as height measurements of local buildings, trees, bridges, etc., as well as hills and other local terrain features. The information so obtained can be used to update or correct the maps or for other cartographic, earth resource management, and similar purposes. Analyses made with the VMA Module are based on measuring the x parallax differences, while manually compensating for y parallax.

The VMB Module uses a mathematical approximation closer to the ideal model of the terrain being analyzed than that used by the VMA Module. It has provisions for automatic introduction of corrections for small values of camera tilts and relative displacements. This results in automatic y parallax correction. One resulting feature is the capability for operation in a constant elevation mode that allows plotting of elevation contours. These corrections are determined from measurement of y parallax during setup and from other data input by the operator. With these capabilities, the VMB Module can be used not only for all the applications of the VMA Module, but also for thematic mapping using near vertical photography.

The VMA Module, when combined with the Z.T.S., is a self-contained instrument for land use studies from aerial photography. The operator scans the area in three dimensions through the medium of stereoscopic aerial photography superimposed on a base map. Scanning is a motorized, onehanded operation. With the other hand, the operator annotates the map with feature locations, planimetric shapes, heights, and elevations.

The VMA Module includes a frame mounted on a base that carries two glass stages; the frame can be moved manually over a distance sufficient to view the entire overlapping portions of $9'' \times 9''$ photographs in both x and y directions. In addition, the left stage can be moved over a short range in the y direction manually in the VMA Module embodiment, and by means of a motor in the VMB Module embodiment. This adjustment serves to remove y parallax.

Each stage has rigidly attached to it a clamping assembly to which transparent plastic photo-carriers are fastened. The clamping assembly allows for the photo-carriers to be moved over a limited distance in the x direction and also rotated over a limited angle about the principal points of the photo-carriers of the stages.

The plastic photo-carriers have permanent reference marks at the centers of their four sides and the four corners. In addition, the principal point is marked with a cross at the center of the photo-carrier. The photographs are placed on the photo-carriers and fastened with adhesive material such that the fiducial marks coincide with the marks at the sides of the photo-carriers. This results in the crosses at the center of the photo-carriers marking the locations of the principal points. The photo-carriers then are clamped onto the stages.

The illumination and viewing optics are provided by the Z.T.S. wherein either the VMA or VMB Modules replace the normal stages. After the photo-carriers with photographs are placed on the stages, they are viewed by the operator through the Z.T.S. binocular optical head, and manually aligned using the rotating and translating mechanisms associated with the clamping assembly until a satisfactory stereoscopic image is produced.

The stereoscopic parallax difference is determined from a measurement by the parallax bar which is attached to the frame of the stages, which parallax bar has its longest dimension in the x direction. The parallax bar is motorized and can be moved in x and y directions by the operator using a joystick.

Attached to the parallax bar are two optical reticles that protrude over the stages and the photographs mounted on the photo-carriers, with their lower surfaces touching the photographs. To prevent damage to the photographs or the reticles through abrasion, special scuff-resistant plastic is used for the reticles, and further, the cylindrical reticles can move up and down in their holders with a minimum of force; thus the reticles glide over the surface of the photographs with a minimum of pressure.

Both reticles have in their centers small dots visible to the operator through the eyepieces. These dots may be produced by drilling a small shallow hole in the center of the plastic reticle insert and filling this hole with fluorescent material. When illuminated with fluorescent light from the ring illuminators surrounding the inserts, the dots fluoresce and scatter visible light, thus generating a distinct image in the field of view of the operator. It is also possible to provide inserts with opaque dots.

While one, say the right, reticle is fixed to the parallax bar, the other (left) reticle can be moved in the x direction over a limited distance by means of a motor which is mounted on the parallax bar. The motor is controlled by a knob on the top of the joystick such that the direction of rotation of the knob determines the direction in which the reticle is moving. A linear incremental transducer mounted on the parallax bar, with its reading head attached to the reticle, is used to measure the displacement of the left reticle.

To determine the parallax of a given point of interest, and therefore indirectly its height or elevation, the operator observes the reference dots in the reticles appearing over the imagery in the photographs; the dots, when properly adjusted, appear fused into a single floating mark. Using the x-y translation of the parallax bar, the operator places first the floating mark over the right principal point in the stereoscopic image. The floating mark may appear above or below the level of the point of interest (or the top of the object). The operator then turns the knob on the joystick to adjust the position of the floating mark until the mark appears to "sit" on the surface. At this point, the operator zeroes the x-y coordinate system (i.e., sets the present x and y coordinate to a value of zero). The zero coordinates are stored in microprocessor memory.

Next, the operator proceeds to repeat the procedure for the left principal point, except that the parallax reading of the left principal point is set to zero and stored in microprocessor memory. At the same time the length of the base is measured as the distance between the right principal point and the conjugate of the left principal point, and stored in microprocessor memory as photo base b.

Having established the local reference, the operator can now proceed to measure the heights of any points of interest using essentially the same procedure. The stereoscopic parallax differences and planimetric data are collected by the microprocessor and used together with information on flight height, entered by the operator via key board, and the length of the photo base b, measured directly from the photographs, to compute and display the desired height information.

In order to measure elevations with respect to the datum, the ground elevation of some point on the photographs relative to datum needs to be known from the map overlay or some other source. Using this information and the local elevation, the microprocessor can compute the ground elevation for the point of interest. Heights of objects may be determined similarly by first measuring the elevation or height at the base of the object, setting the value to zero, and then measuring the height of the top of the object directly.

The VMB Module additionally measures accurately the displacement under motor control of the left stage in the y direction to compensate for or measure the y parallax. The data obtained is processed by the microprocessor, which is programmed to solve a set of equations, together with the information on focal length of the camera lens, and the base, for yielding accurate elevation and height data. Flight height is automatically computed from X, Y and Z ground coordinates of control points entered via the keyboard and corresponding photo x, y and px measurements.

Both the VMA and VMB Modules have keyboards, including special functions keys and numerical pads, and multiple alphanumeric displays to enter and display intermediate values and final results in terms of elevations or heights. The Modules may display the results in both metric and English units.

Having described generally the configuration and function of the VMA and VMB Modules, in conjunction with the drawings herein, a more detailed review shall be made of information transfer between the operator and the components of the VMA and VMB Modules, the equations solved by microprocessor to determine elevation and height, the parallax bar and stage assembly, and the electronic control circuit.

FIG. 1 presents a diagrammatic schematic of data transfer between an operator 105 and the components of the VMA Module 11. The hardware 102 of the VMA Module is mounted in place of the conventional stages in the Z.T.S. 101. Hardware 102, best seen in FIG. 3, includes parallax bar 323, the px linear incremental transducer 324, stepper motors 321, 322, and 327; and left stage 302 and right stage 303. Stepper motors 321, 322, and 327 are controlled by the control circuit 103 via connection 115. The current pulses driving stepper motors 321 and 322 are counted to record the y and x displacements of parallax bar 323, respectively. The displacement in x direction of the left reticle 320 is measured by px linear incremental transducer 324. The signal representing px from px linear incremental transducer 324 is input via the connection 112 into control circuit 103.

VMA Module hardware 102 also includes stages 302 and 303, onto which are placed photo-carriers 304 and 306 and photographs 305 and 307, respectively. Points of interest on photographs 305 and 307 are acquired using right reticle 319 and left reticle 320 which are in operative association with parallax bar 323. In order to obtain a good stereoscopic image, photo-carriers 304 and 306 are adjustably mounted upon stages 302 and 303, respectively. The left stage 302 can be separately manually moved by operator 105 in the y direction to cancel the y parallax py.

Control circuit 103, best seen in FIG. 7, includes a microprocessor board 402, an encoder logic board 403 which receives and processes the signals from the px incremental linear transducer 324 and also tracks the position of stepper motors 321 and 322 by counting drive pulses thereto, motor drive logic board 404, motor drive power board 405, and power supplies 406 and 407. Control circuit 103 functions in a manner known to those skilled in the art to:

(a) accept operator's 105 inputs H and $h_C$ via keyboards 419 and 420 located in display/keyboard module 104 and connector 113;

(b) accept position information (x, y, px) related to the parallax bar 323 via connector 112;

(c) accept motor control inputs (x, y, px) via connector 107 from the operator 105 using joystick module 106;

(d) solve the approximate equations for the elevation (h) and height (dh), based on the microprocessor algorithms stored in ROM located on microprocessor board 402, as more fully set forth hereinafter;

(e) perform conversions of pulse counts to dimensions and also of English to metric and metric to English units;

(f) control all displays in display/keyboard module 104 to output the measurement parameters, position information, and final elevation and height results;

(g) control stepper motors 321, 322, and 327; and, (h) supply power to the ring illuminators 308 and 309 in the reticles 319 and 320.

Figure 2:
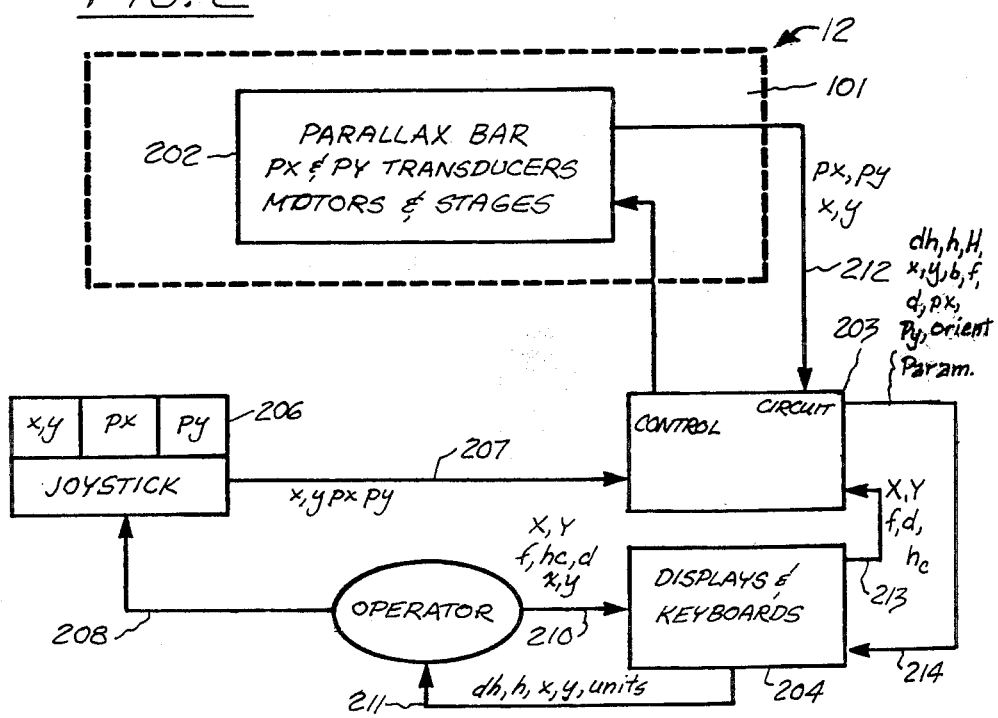
FIG. 2 is a block diagram of another embodiment 12 of the present invention, the "VMB Module", for making the determination of object heights and elevations relative to either a known control point elevation or to a datum.

Referring now to the FIG. 2, the major differences between the VMA and VMB Modules can be recognized as mainly relating to the manner in which the y parallax py is utilized and compensated for. While in the VMA Module py is manually cancelled, in the VMB Module after the initial set up which includes acquisition of several py values for various points on the photograph, the compensation for this factor is automatic under the control of the microprocessor 402. Furthermore, various values acquired during setup are utilized to compensate the results (dh, h) for errors due to the deviations (such as a result of camera tilt) from the true vertical in taking the photographs. As is reflected in FIG. 2, operator 105 is not required to manually compensate for py; instead the appropriate function on joystick 206 is used to control via control circuit 203 and py motor 326 the motion of left stage 302 in the y direction. To compute the necessary compensation microprocessor board 402 requires the value of the camera's focal length f and grid distance d which are entered by operator 105 via connector 210. This information is transferred via connector 213 along with control point data (X, Y, $h_C$).

To perform its enhanced functions, the VMB Module, in addition to hardware 102 of the VMA Module, has an extra control on joystick 206 for py motor 326, and a py shaft encoder 325 which measures the displacement py of left stage 302 in the y direction. Control circuit 203 differs from the corresponding control circuit 103 only in the amount of memory in the microprocessor board 402, necessary to store the different algorithms which are used to compute the elevations and heights. Keyboards 419 and 420 have extra keys which enable the operator 105 to enter the required additional data.

In addition to routine control algorithms, and algorithms for conversion of data into the appropriate dimensional units, microprocessor board 402 in both the VMA Module and VMB Module has algorithms for solving the equations required to convert the various variable position inputs and other parameters into final results in terms of elevation h and height dh. In the VMA Module two equations are solved in the microprocessor 402. The first, for determining the height of objects above the ground level or the depth of depression below the ground level, is as follows:

$$dh = [px/(b+px)]H$$

where H is the flying height relative to the left principal point elevation and px is the x parallax difference relative to the left principal point. The elevation h of any point on the photograph is given by:

$$h = h_C - dh_C + dh$$

where $dh_C$ is the computed control point height, and dh is the height of the point whose elevation is to be computed. Both $dh_C$ and dh are heights relative to the left principal point. The equations for the VMB Module are more involved, inasmuch as they correct approximately for camera tilts and displacements, and therefore provide for approximate relative orientation, scaling the leveling in accordance with the usual recognized geometric relations.

Figure 3:
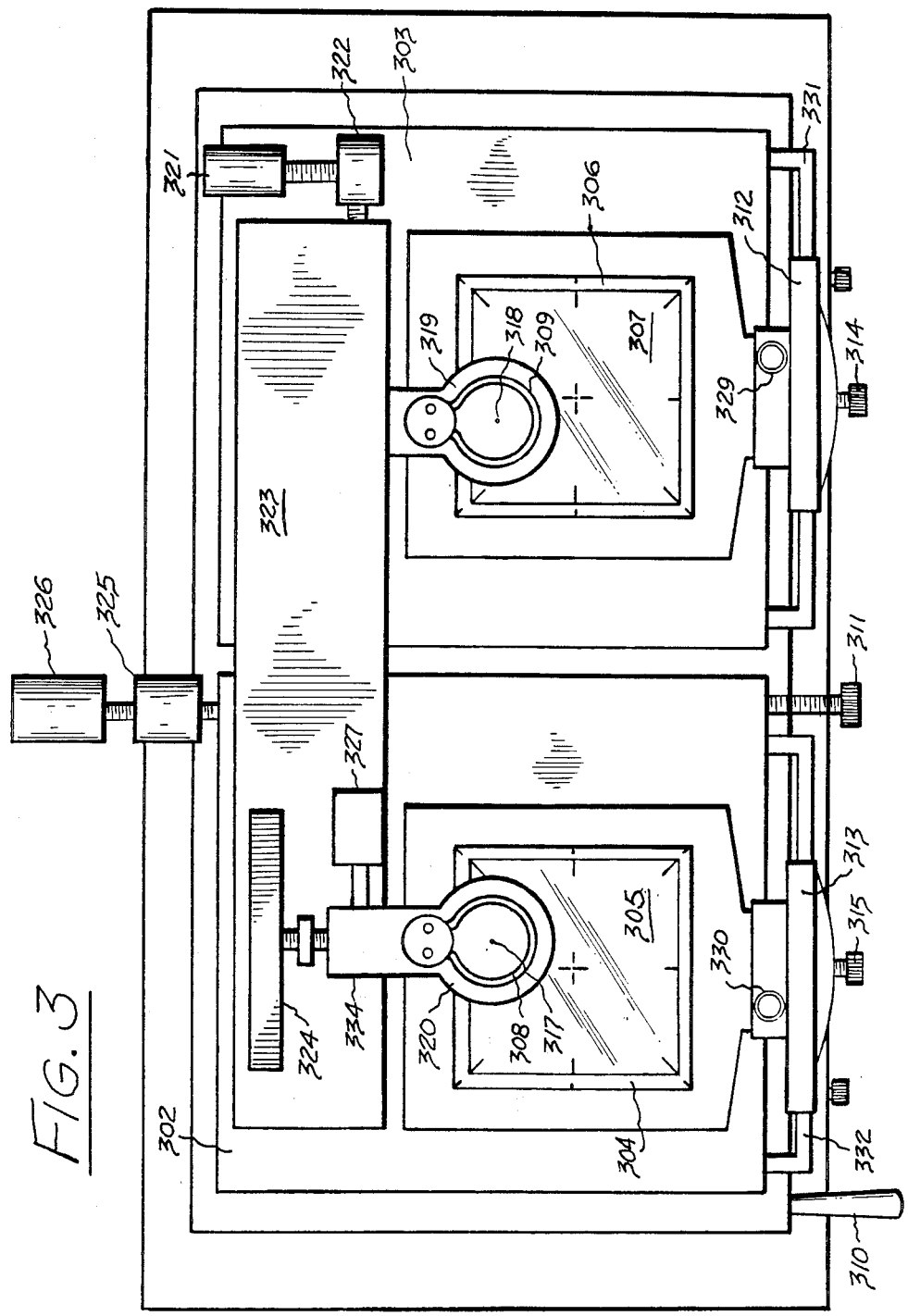
FIG. 3 is a diagrammatic plan view of the exemplary apparatus shown in FIG. 4 taken from just above the stages upon which the stereo photographs are positioned.
Figure 4:
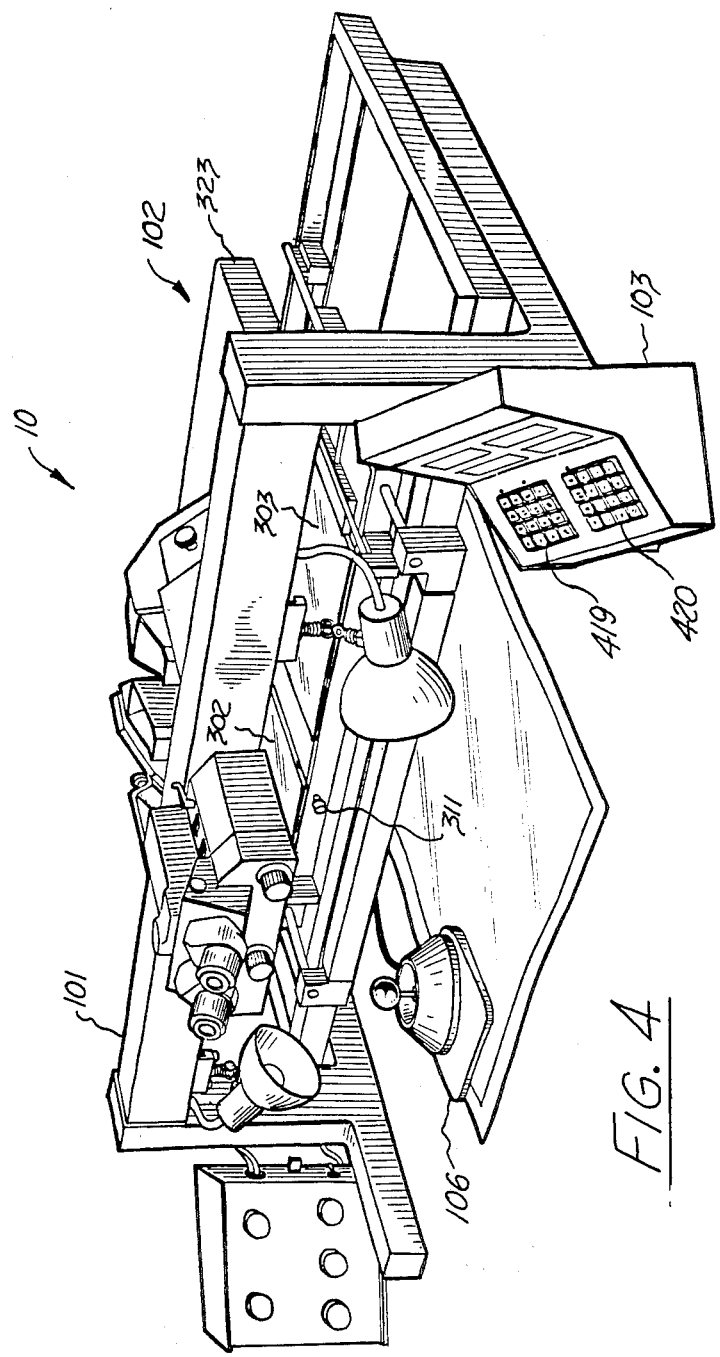
FIG. 4 is a perspective view of an exemplary apparatus according to the concept of the present invention in operative association with a BAUSCH & LOMB STEREO ZOOM TRANSFER SCOPE.

Turning now to FIGS. 3, 5 and 6, the parallax bar and stage assembly, 102 in the VMA Module and 202 in the VMB Module are mounted on a base which fits into Z.T.S. 101 in place of its usual stages. A frame 301 which supports transparent plate glass stages 302 and 303, parallax bar 323 and the associated stepper motors 321 and 322, can be moved on the base by the operator 105 in both x and y directions using handle 310. In this manner operator 105 can bring the desired section of the photographs into the field of view of the Z.T.S. 101 optics.

Right stage 303 is fixed to the frame, while the left stage 302 can be moved over a short distance by the operator in the y direction using the manual py control 311 to cancel the y parallax. Each stage 302 and 303 has an adjustable clamp (330, 329) designed to firmly fix photo-carriers 304 and 306 to their respective stages 302 and 303. An exemplary photo-carrier (304, 306) is shown in FIG. 6 having permanent reference marks 350 and a notched tab 351 for slidable engagement with adjustable clamps 329, 330, respectively. Adjustable clamps 329 and 330 allow for limited movement of both photo-carriers 304 and 306 in the x direction and rotation about the principal points over a limited angle, in order to achieve a satisfactory stereoscopic image. The translation is permitted by attaching adjustable clamps 329 and 330 to overlap adjust slides 313 and 312, respectively. Overlap adjust slides 313 and 312 move in the x direction on rails 332 and 331. Overlap adjust slides 313 and 312 also carry rotational mechanisms 315 and 314 which the operator can turn using small handles attached to these mechanisms.

Parallax bar 323 is mounted on a bridge that can move in the y direction on rails attached to the frame 301. This movement is controlled by stepper motor 321 mounted to frame 301. The translation of the parallax bar 323 in the x direction is controlled by stepper motor 322 mounted on the bridge. Reticles 319 and 320 are attached to the parallax bar 323 and consequently move with the parallax bar, permitting operator 105 to position reticles 319 and 320 at any desired point in the field of view over the photographs.

An exemplary right reticle 319 is shown in greater detail in FIG. 5. A frame 333 is attached by adjustable screw 334 to parallax bar 323. Frame 333 holds a cylindrical insert 319 made of transparent, abrasion-resistant plastic of optical quality. In the center of the insert 319 there is a small dot 318 generated by suitable means such as machining a small shallow hole in the plastic, and filling it with fluorescent material, which is seen by operator 105 when apparatus 10 is operating stereoscopically, in conjunction with the corresponding dot 317 on the left reticle as a floating mark that can be positioned over the point of interst. Dot 318 is illuminated by fluorescent ring illuminator lamp 309 which is inserted into a circular channel on the periphery of insert 319. To prevent damage to the photographic film surface or the insert surface in contact with the film, insert 319 is held to the reticle frame 333 by three roller bearings 316 spaced equidistant along the circumference of insert 319. As a result, insert 319 can move freely vertically as reticle 319 moves horizontally on the surface of the film, reducing the force exerted on the film surface to a minimum.

Left reticle 320 is attached to a rail on parallax bar 323 such that it can move over a limited range in the x direction to measure the x parallax difference px. This translation is controlled by the stepper motor 327. Displacement of the left reticle 320 is measured by px linear incremental transducer 324 which is fastened to the body of the parallax bar 323. The head of transducer 324 is attached to connecting member 334 of left reticle 320 so that they move together.

It should now be appreciated that the salient difference between assemblies 102 of the VMA Module and assembly 202 of the VMB Module lies in the control and measurement of the py displacement of the left stage 302. In the VMB Module this displacement is controlled by stepper motor 326 and measured by py shaft encoder 325, rather than manually as is done in the VMA Module.

The substantially identical control circuit 103 for the VMA Module and 203 for the VMB Module are shown in FIG. 7. For convenience, this discussion shall focus on control system 103, which can be seen in FIG. 7 to communicate with display/keyboard module 104, px linear incremental transducer 324, py shaft encoder 325, joystick 206, stepper motors 321, 322, 326, and 327, and ring illuminators 308 and 309. Control circuit 103 includes power supplies 406 and 407, of which the latter is a 24V motor supply; power resistor network 410 designed to shorten the time constants of stepping motors 321, 322 and 326, 327 and at the same time reduce the supply voltage from 24 to 5V; transformers 408, 409 for ring illuminators 308 and 309; motor drive power board 405 which supplies power for stepper motors 321, 322, 326 and 327; motor drive logic board 404 for converting the analog signals from joystick 206 into appropriate pulse sequences for the various motors; encoder logic board 403 which contains the pulse-shaping and counting circuits for px linear incremental transducer 324 and py shaft encoder 325, as well as the counting circuits for the x and y stepping motors 321 and 322; and the microprocessor board 402. The latter has an eight-bit microprocessor such as a Model 8031 commercially available from Intel Corporation of Santa Clara, California, supported by the appropriate I/O logic, ROM memory for storing the operational algorithms and programs, and RAM memory for storing variables, and intermediate and final results. An exemplary program to enable the Intel Model 8031 microprocessor to carry out the functions described herein is set forth in hexadecimal form in an appendix submitted to the Patent and Trademark Office.

Joystick 206 provides x-y analog control signals for the translation of the parallax bar 323, for the px motion of the left reticle 320, and for py translation. Deflection of joystick 206 controls the pulse rates to the various stepper motors and, therefore, the speed of translation. When centered, joystick 206 generates no control signals, so that parallax bar 323 is motionless. The analog circuitry in motor drive logic board 404 receives signals corresponding to joystick 206 delfection and rotation, and performs an exponential function conversion on these signals such that the motor speed increases exponentially with the deflection or rotation of joystick 206. Display/keyboard module 104 includes keyboard 419 with special function keys and keyboard 420 for numerical entry. The special function key board 419 is used by operator 105 to enter specific variables or to recall variables, intermediate values, or final results. This keyboard is also used to select either English or metric system of units, and the specific unit magnitude (e.g., millimeters, meters, kilmeters; or inches, feet, or miles).

Five displays, preferably alphanumeric in type, are provided for indicating the x-y position of the floating mark (412, 413), the system of units and specific units selected (415), the entered values of the variables (414), and the recalled parameters or final results (422). Display 416 shows which variable is being measured (dh or h) or recalled (b, x, y, $h_C$, H) while display 417 indicates the units of the display. As should be evident operator 105 interacts with apparatus 10 primarily through the joystick 206, display/keyboard module 104, and, of course, by viewing the imagery through the eyepieces of the Stereo Z.T.S.

Having described the construction of apparatus 10 and operation of selected portions thereof, the exemplary overall operation of VMA Module 11 now may be explained.

Several adjustments must be made prior to any elevation or height determination. First, the two stereo photographs 305 and 307 must be mounted upon photo-carriers 304 and 306, making sure that the fiducial marks on the photographs are aligned with the corresponding marks 350 on photo-carriers 304 and 306. Photographs 305 and 307 may be fastened to photo-carriers 304 and 306 with adhesive stickers or tape. Photo-carriers 304 and 306 are then inserted into clamps 330 and 329 and aligned and secured by tightening of the screws in these clamps. Next any parallax py must be removed by operator adjustment of py control and alignment of photographs 305 and 307, using the overlap adjust slides 312 and 313 and the rotational mechanisms 314 and 315, such that a satisfactory stereo image (and a single floating point) is achieved and the flight lines of the stereo photo pair are properly aligned by viewing the imagery through the eyepieces. Both stages can now be moved together by moving handle 310 to locate the right principal point.

Following location of the right principal point in the field of view, its coordinates are established as a reference location in control circuit 103. Operator 105 selects the units of measurement by positioning a switch on display/keyboard module 104 and proceeds to use joystick 106 to move the floating mark seen through the eyepieces in alignment with the right principal point. The x and y position keys on display/keyboard module 104 are cleared establishing the coordinates of the right principal point as reference location (O, O).

The value of the base b and the height at the principal point are found, and the flight height entered into control circuit 103 in order to determine elevation and heights at other desired locations. This is achieved by using joystick 206 to set the floating mark on the left principal point and the base b key on display/keyboard module 104 set, thereby storing the x coordinate of the left principal point in memory as photo base b and making parallax px zero. Operator 105 may determine flight height H from photographs 304 and 306 in any of the well known manners and enter the same through display/keyboard module 104. Apparatus 10 is now ready to perform accurate height measurements in the area of the terrain depicted by the image by simply using joystick 106 to move the floating point to the location of interest and reading the displayed height thereof.

The elevation with respect to datum may also be determined if the elevation $h_C$ of any point on the displayed terrain, called the "control point", is known from other sources. This elevation is entered into control circuit 103 via display/keyboard module 104, which automatically computes and displays the elevations for operator selected points of interest.

Although operation of VMA Module 11 has been discussed, operation of the VMB Module 12 is substantially the same but for the addition of operator entry of the focal length f of the camera lens and the photo grid distance d during initial setup, and measurement of y-parallax made at several grid points. This permits control circuit 203 to compute displacements due to camera tilts and other deviations from vertical photography, and issue appropriate corrections dpy and dpx in generating drive signals to py stepper motor 326 and px stepper motor 327. While VMA Module 11 is restricted to making local elevation and height measurements, VMB Module 12, using a more accurate model of the terrain, can be used to determine height and elevation information on a larger scale and is suitable for revision and completion of thematic maps.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otehrwise substantially improve the art of determining object elevation and height from images thereof.

What is claimed is:

1. An apparatus for determining the heights of objects and elevations of features from stereoscopic viewing of input records which comprises;
    (a) means for carrying the input records;
    (b) viewing means for stereoscopic viewing of input records on said carrying means;
    (c) a movable parallax bar disposed about the carrying means;
    (d) a pair of reticles disposed close to the carrying means and attached to and spaced apart on said parallax bar, each of said reticles having a reference mark;
    (e) means for moving the parallax bar to permit the positioning of either of the reticles with respect to a point of interest in the input records;
    (f) means for longitudinally moving one reticle on the parallax bar in a collinear direction relative to the other reticle to cause the reference marks of the reticles to fuse as a floating mark at the point of interest when viewed through said viewing means; and (g) microprocessor means for generating compensation factors based on values determined during initial set up and for measuring parallax based on the position of the reticles, the microprocessor means utilizes the generated compensation factors to compensate the parallax measurements for errors in y parallax and for errors in x parallax difference due to deviations from vertical photography as the floating mark is moved, and for automatically computing object heights and feature elevations based on the compensated parallax measurements.

2. An apparatus according to claim 1 wherein the parallax bar is movable in the y direction by a motor means and is movable in the x direction by another motor means.

3. An apparatus according to claim 1 wherein said reticles move with the parallax bar, one of the reticles being rigidly attached to the bar and the other being movable on the bar in the x direction.

4. An apparatus according to claim 1 wherein one of the records carrying means is movable by motor means in the y direction to correct for y parallax.

5. An apparatus according to claim 1 having a single hand control means which provides control signals for the translation of the parallax bar in the x and y directions and for movement of at least one reticle in the x direction on the parallax bar.

* * * * *